(12) United States Patent
Waterson et al.

(10) Patent No.: US 8,710,168 B2
(45) Date of Patent: Apr. 29, 2014

(54) POLYMERS

(75) Inventors: Carl Waterson, Wrexham (GB);
Christopher J. Booth, Reading (GB)

(73) Assignee: Infineum International Limited,
Abingdon, Oxfordshire (GB)

( * ) Notice: Subject to any disclaimer, the term of this patent is extended or adjusted under 35 U.S.C. 154(b) by 266 days.

(21) Appl. No.: 12/971,099

(22) Filed: Dec. 17, 2010

(65) Prior Publication Data

US 2011/0146136 A1 Jun. 23, 2011

(30) Foreign Application Priority Data

Dec. 21, 2009 (EP) .................................. 09180123

(51) Int. Cl.
*C08F 218/16* (2006.01)
*C08F 218/04* (2006.01)
*C08F 218/08* (2006.01)

(52) U.S. Cl.
USPC ........... 526/323; 526/332; 526/321; 526/318; 526/318.2; 526/318.3; 526/318.43; 526/318.44; 44/403; 508/467; 508/468

(58) Field of Classification Search
USPC .......... 508/467, 468; 526/323, 332, 321, 318, 526/318.2, 318.3, 318.43, 318.44; 44/403
See application file for complete search history.

(56) References Cited

U.S. PATENT DOCUMENTS

| | | | | |
|---|---|---|---|---|
| 4,661,121 A | * | 4/1987 | Lewtas | ........................... 44/395 |
| 5,998,530 A | | 12/1999 | Krull et al. | |
| 2004/0020106 A1 | | 2/2004 | Tack et al. | |
| 2009/0151235 A1 | * | 6/2009 | Scanlon et al. | ................. 44/338 |

FOREIGN PATENT DOCUMENTS

| | | |
|---|---|---|
| EP | 0857776 | 8/1998 |
| EP | 1482024 | 12/2004 |
| EP | 1 770 150 A1 | 4/2007 |

OTHER PUBLICATIONS

Coley, T. et al., *Journal of the Institute of Petroleum*, entitled: "New laboratory tests for predicting low temperature operability of diesel fuel", 52(510), pp. 173-193, Jun. 1966.

* cited by examiner

*Primary Examiner* — Ling Choi
*Assistant Examiner* — David L Miller
(74) *Attorney, Agent, or Firm* — Kenyon & Kenyon LLP

(57) ABSTRACT

The present invention is a polymer having structural units, units of formula I, units of formula II and units of either formula IIIa or formula IIIb:

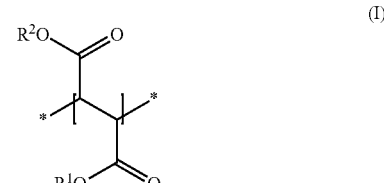

(I)

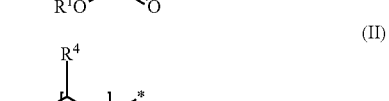

(II)

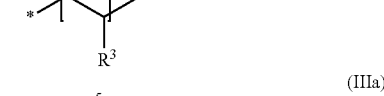

(IIIa)

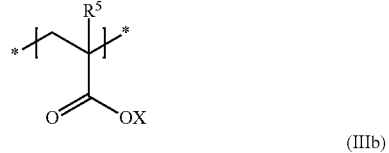

(IIIb)

The polymer improves the low-temperature properties of fuel oils from petroleum sources and especially from vegetable or animal sources.

7 Claims, No Drawings

POLYMERS

This invention relates to polymers effective to improve the low-temperature properties of fuel oils and to fuel oil compositions containing the polymers.

Fuel oils, whether derived from petroleum or from vegetable sources, contain components, e.g., n-alkanes or methyl n-alkanoates, that at low temperature tend to precipitate as large, plate-like crystals or spherulites of wax in such a way as to form a gel structure which causes the fuel to lose its ability to flow. The lowest temperature at which the fuel will still flow is known as the pour point.

As the temperature of a fuel falls and approaches the pour point, difficulties arise in transporting the fuel through lines and pumps. Further, the wax crystals that form tend to plug fuel lines, screens, and filters at temperatures above the pour point. These problems are well recognised in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter. The wax from a diesel fuel, which is primarily an alkane wax, and the methyl n-alkanoates in vegetable-derived fuels crystallize as platelets. Certain additives inhibit this and cause the waxes to adopt an acicular habit, the resulting needles being more likely to pass through a filter, or form a porous layer of crystals on the filter, than are platelets. Other additives may also have the effect of retaining the wax crystals in suspension in the fuel, reducing settling and thus also assisting in the prevention of blockages.

The present invention is based on the discovery of certain types of ter-polymers and higher polymers which are effective to improve the low temperature properties of fuel oils. The polymers may find use in any type of fuel but are particularly effective when used in fuel oils which are derived from vegetable or animal sources such as fuel oils comprising fatty acid alkyl esters and blends of these oils with petroleum-derived fuel oils. These oils are often known as biodiesels or biofuels and are commonly fatty acid methyl esters (FAME).

In accordance with a first aspect, the present invention provides a polymer comprising structural units of formula I, structural units of formula II and structural units of either formula IIIa or formula IIIb:

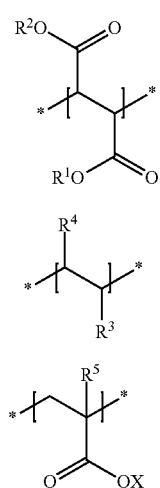

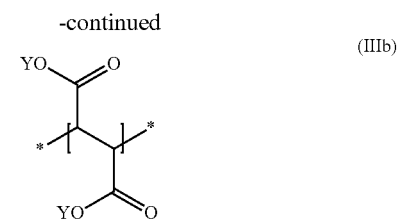

wherein $R^1$ and $R^2$ are the same or different and each represent a $C_8$ to $C_{22}$ alkyl group, preferably a $C_{12}$ to $C_{16}$ alkyl group; wherein $R^3$ represents $-OCOR^6$, $-COOR^{15}$, $-COOH$, or a $C_1$ to $C_{22}$ alkyl group, preferably a $C_1$ to $C_{12}$ alkyl group, and $R^6$ represents a $C_1$ to $C_{22}$ alkyl group, preferably a $C_1$ to $C_{12}$ alkyl group; wherein $R^4$ is hydrogen, $-COOH$ or $-CH_2COOR^{16}$; wherein $R^{15}$ and $R^{16}$ are the same or different and each represent a $C_8$ to $C_{22}$ alkyl group, preferably a $C_{12}$ to $C_{16}$ alkyl group; wherein $R^5$ is hydrogen or methyl; wherein X represents a group of formula IV, formula V or formula VI:

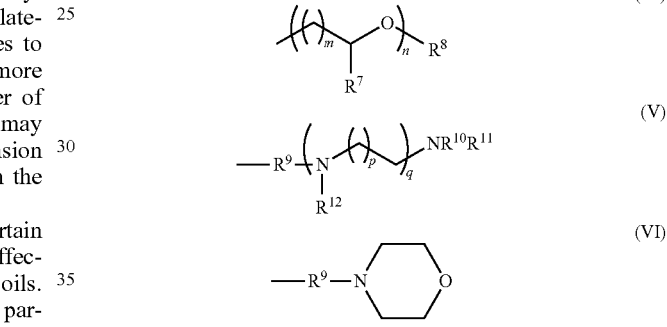

wherein $R^7$ represents hydrogen or a $C_1$ to $C_8$ alkyl group, $R^8$ represents a $C_1$ to $C_8$ alkyl group, m is an integer from 1 to 10, and n is an integer from 1 to 30, preferably from 5 to 20; wherein $R^9$ is a $C_1$ to $C_8$ alkyl linkage, $R^{10}$, $R^{11}$ and $R^{12}$ are the same or different and each represent hydrogen or a $C_1$ to $C_8$ alkyl group, p is an integer from 1 to 10, and q is zero or an integer from 1 to 10; and wherein Y represents a group of formula IV wherein $R^7$ represents hydrogen or a $C_1$ to $C_8$ alkyl group, $R^8$ represents a $C_1$ to $C_8$ alkyl group, m is an integer from 1 to 10, and n is an integer from 1 to 30, preferably from 5 to 20;

and optionally, structural units of formula VII:

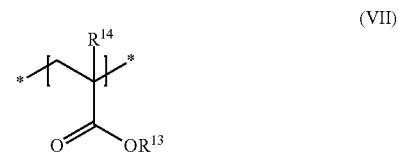

wherein $R^{13}$ represents a $C_8$ to $C_{22}$ alkyl group, preferably a $C_{12}$ to $C_{16}$ alkyl group; and wherein $R^{14}$ is hydrogen or methyl.

Alkyl groups $R^1$ and $R^2$ may be linear or branched but are preferably linear. Preferably $R^1$ and $R^2$ are the same and each represent a linear $C_{12}$ to $C_{14}$ alkyl group. In a preferred embodiment, $R^1$ and $R^2$ are each a linear $C_{12}$ alkyl group.

Preferably $R^3$ represents $-OCOR^6$.

Alkyl group $R^6$ may be linear or if $C_3$ or larger, branched. Preferably $R^6$ represents a $C_1$-$C_8$ alkyl group. In a preferred embodiment $R^6$ is methyl.

When present, alkyl groups $R^{15}$ and $R^{16}$ may be linear or branched but are preferably linear. Preferably when present $R^{15}$ and $R^{16}$ are the same and each represent a linear $C_{12}$ to $C_{14}$ alkyl group. In a preferred embodiment, when $R^{15}$ and $R^{16}$ are present they are each a linear $C_{12}$ alkyl group.

Preferably $R^4$ is hydrogen.

In a preferred embodiment, $R^3$ represents —OCOR$^6$ where $R^6$ is methyl, and $R^4$ is hydrogen. In another embodiment, $R^3$ represents —OCOR$^6$ where $R^6$ is 2-ethylhexyl, and $R^4$ is hydrogen.

In a preferred embodiment, X represents a group of formula IV. Preferably $R^7$ is hydrogen, $R^8$ is methyl, m is an integer from 1 to 6, for example 1, 2 or 3 and n is an integer from 6 to 18, for example 9, 10, 11, 12, 13, 14, 15 or 16.

In another preferred embodiment, X represents a group of formula V. Preferably $R^9$ is a $C_2$ alkyl linkage, $R^{10}$ and $R^{11}$ are both methyl, and q is zero.

Preferably Y represents a group of formula IV where $R^7$ is hydrogen, $R^8$ is methyl, m is an integer from 1 to 6, for example 1, 2 or 3 and n is an integer from 6 to 18, for example 9, 10, 11, 12, 13, 14, 15 or 16.

When structural units of formula VII are present, alkyl group $R^{13}$ may be linear or branched but is preferably linear. Preferably $R^{13}$ represents a linear $C_{12}$ to $C_{16}$ alkyl group, for example a linear $C_{12}$ alkyl group or a linear $C_{14}$ alkyl group.

The polymer may contain further structural units but preferably the polymer contains only structural units of formulae I, II, IIIa and/or IIIb or the polymer contains only structural units of formulae I, II, IIIa and/or IIIb and VII.

In a preferred embodiment the polymer comprises structural units of formulae I, II and IIIa wherein X represents a group of formula IV.

In a more preferred embodiment the polymer consists of structural units of formulae I, II and IIIa wherein X represents a group of formula IV.

In another preferred embodiment the polymer comprises structural units of formulae I, II and IIIb.

In a more preferred embodiment the polymer consists of structural units of formulae I, II and IIIb.

In another preferred embodiment the polymer comprises structural units of formulae I, II and IIIa wherein X represents a group of formula V.

In a more preferred embodiment the polymer consists of structural units of formulae I, II and IIIa wherein X represents a group of formula V.

In another preferred embodiment the polymer comprises structural units of formulae I, II, IIIb and VII.

In a more preferred embodiment the polymer consists of structural units of formulae I, II, IIIb and VII.

The proportion of each of the structural units present in the polymer may vary. Preferably units of formula I will comprise from 5 to 80% of the polymer on a molar basis, more preferably from 20 to 60%.

Preferably units of formula II will comprises from 5 to 70% of the polymer on a molar basis, more preferably from 10 to 50%.

Preferably units of formula IIIa when present will comprise from 5 to 60% of the polymer on a molar basis, more preferably from 10 to 50%.

Preferably units of formula IIIb when present will comprise from 5 to 70% of the polymer on a molar basis, more preferably from 10 to 60%.

Preferably units of formula VII when present will comprise from 10 to 50% of the polymer on a molar basis, more preferably from 15 to 40%.

The polymers preferably have a number average molecular weight (Mn) measured by GPC relative to polystyrene calibration standards of between 500 and 50,000, more preferably between 500 and 35,000, most preferably between 1,000 and 20,000; for example between 5,000 and 15,000.

The polymers may be prepared by known methods. A suitable method is a solution phase polymerisation using suitable monomers and a free radical initiator. Any suitable solvent may be employed in the polymerisation. Cyclohexane, methyl ethyl ketone (MEK), toluene and ethyl alcohol have all been found to be effective. Tert-butyl perpivalate has been found to be a suitable free radical initiator although alternatives will be known to those skilled in the art.

Non-limiting examples of suitable monomers to provide the polymer with structural units of formula I include di-alkyl fumarates such as di-dodecyl fumarate and di-tetradecyl fumarate. Non-limiting examples of suitable monomers to provide the polymer with structural units of formula II include vinyl esters such as vinyl acetate, vinyl 2-ethylhexanoate and vinyl neodecanoate; alkyl and di-alkyl itaconates; maleic acid; and 1-alkenes. Non-limiting examples of suitable monomers to provide the polymer with structural units of formula IIIa include poly(alkyleneglycol alkyl ether) acrylates or methacrylates such as poly(ethyleneglycol methyl ether) acrylates and poly(ethyleneglycol methyl ether) methacrylates; dialkylaminoalkyl acrylates or methacrylates such as dimethylaminoethyl acrylate and dimethylaminoethyl methacrylate. Non-limiting examples of suitable monomers to provide the polymer with structural units of formula IIIb include di-poly(alkyleneglycol alkyl ether) fumarates such as di-poly(ethyleneglycol methyl ether) fumarate. Non-limiting examples of suitable monomers to provide the polymer with structural units of formula VII include alkyl acrylates and alkyl methacrylates such as dodecyl acrylate and tetradecyl methacrylate.

In accordance with a second aspect, the present invention provides a fuel oil composition comprising a major amount of a fuel oil and a minor amount of a polymer according to the first aspect.

In accordance with a third aspect, the present invention provides the use of a polymer according to the first aspect to improve the low-temperature properties of a fuel oil.

The Fuel Oil

The fuel oil may be, e.g., a petroleum-based fuel oil, especially a middle distillate fuel oil. Such distillate fuel oils generally boil within the range of from 110° C. to 500° C., e.g. 150° C. to 400° C.

The invention is applicable to middle distillate fuel oils of all types, including the broad-boiling distillates, i.e., those having a 90%-20% boiling temperature difference, as measured in accordance with ASTM D-86, of 50° C. or more.

The fuel oil may comprise atmospheric distillate or vacuum distillate, cracked gas oil, or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or may also contain vacuum gas oil or cracked gas oil or both. The fuels may also contain major or minor amounts of components derived from the Fischer-Tropsch process. Fischer-Tropsch fuels, also known as FT fuels, include those that are described as gas-to-liquid fuels, coal and/or biomass conversion fuels. To make such fuels, syngas ($CO+H_2$) is first generated and then converted to normal paraffins and olefins by a Fischer-Tropsch process. The normal paraffins may then be modified by processes such as catalytic cracking/reforming or isomerisation, hydrocracking and hydroisomerisation to yield a variety of hydrocarbons such as iso-paraffins, cyclo-paraffins and aromatic compounds. The resulting FT fuel can be used as such or in combination with other fuel components and fuel types such as those mentioned in this specification.

The invention is particularly applicable to fuel oils containing fatty acid alkyl esters made from oils derived from animal or vegetable materials, often called biofuels or biodiesels. Biofuels are believed to be less damaging to the environment on combustion and are obtained from a renewable source. It has been reported that on combustion less carbon dioxide is formed by the equivalent quantity of petroleum distillate fuel, e.g. diesel fuel, and very little sulphur dioxide is formed.

Examples of oils derived from animal or vegetable material are rapeseed oil, coriander oil, soyabean oil, cottonseed oil, sunflower oil, castor oil, olive oil, peanut oil, maize oil, almond oil, palm kernel oil, coconut oil, mustard seed oil, jatropha oil, beef tallow and fish oils. Further examples include oils derived from corn, jute, sesame, shea nut, ground nut and linseed oil and may be derived therefrom by methods known in the art. Rapeseed oil, which is a mixture of fatty acids partially esterified with glycerol is available in large quantities and can be obtained in a simple way by pressing from rapeseed. Recycled oils such as used kitchen oils are also suitable.

As alkyl esters of fatty acids, consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower (ca. $C_1$ to $C_6$) aliphatic alcohols. For production of alkyl esters of fatty acids it is advantageous to start from fats and oils which contain low levels of saturated acids, less than 20%, and which have an iodine number of less than 130. Blends of the following esters or oils are suitable, e.g. rapeseed, sunflower, coriander, castor, soyabean, peanut, cotton seed, beef tallow etc. Alkyl esters of fatty acids based on certain varieties of rapeseed oil having more than 80 wt % of unsaturated fatty acids with 18 carbon atoms, are particularly suitable.

Whilst all of the above oils may be used as biofuels, preferred are vegetable oil derivatives, of which particularly preferred biofuels are alkyl ester derivatives of rapeseed oil, cottonseed oil, soyabean oil, sunflower oil, olive oil, or palm oil, rapeseed oil methyl ester being especially preferred.

The invention is applicable to pure biofuels. In one embodiment therefore, the fuel oil comprises essentially 100% by weight of an oil derived from a plant or animal source, preferably essentially 100% by weight of fatty acid alkyl esters, most preferably fatty acid methyl esters.

Biofuels are commonly used in combination with petroleum-derived oils. The present invention is also applicable to mixtures of biofuel and petroleum-derived fuels in any ratio. Such fuels are often termed Bx fuels where x represents the percentage by weight of biofuel in the biofuel-petroleum blend. Examples, include fuels where x is 2 or above, preferably 5 or above, for example up to 10, 25, 50, or 95. Preferably the biofuel component in such Bx fuels comprises fatty acid alkyl esters, most preferably fatty acid methyl esters.

The fuel oil, whether petroleum or vegetable or animal-derived preferably has a low sulphur content. Typically, the sulphur content of the fuel oil will be less than 500 ppm (parts per million by weight). Preferably, the sulphur content of the fuel oil will be less than 100 ppm, for example, less than 50 ppm. Fuel oils with even lower sulphur contents, for example less that 20 ppm or less than 10 ppm are also suitable.

The amount of polymer present in the fuel oil may vary according to the type of fuel oil and the low-temperature properties required from the fuel oil. Suitably the polymer will be present in the fuel oil in an amount of between 10 and 5,000, preferably between 10 and 1,000, more preferably between 50 and 500 ppm by weight based on the weight of the fuel oil.

As in known in the art, fuel additives are commonly supplied in the form of an additive concentrate comprising one or more fuel additives in a suitable carrier fluid or solvent. In accordance with a fourth aspect, the present invention provides an additive concentrate comprising a polymer according to the first aspect and a compatible solvent or carrier therefor. Examples of suitable solvents and carrier fluids are known in the art and include hydrocarbon solvents such as naphtha, kerosene, diesel and heater oil, aromatic hydrocarbons such as those sold under the 'SOLVESSO' trade name, alcohols, ethers and other oxygenates and paraffinic hydrocarbons such as hexane, pentane and isoparaffins. The carrier fluid or solvent is chosen having regard to its compatibility with both the polymer and the fuel oil.

The polymers of the present invention may be provided to the fuel oil directly or in the form of an additive concentrate.

The polymers of the present invention may also find use in lubricating oils as flow-improvers or pour point depressants.

Further Additives

Other additives capable of altering the low-temperature properties of fuel oil may be combined with the polymers of the present invention. Suitable materials will be known to those skilled in the art and include flow-improvers such as ethylene-unsaturated ester copolymers and terpolymers, for example, ethylene-vinyl acetate copolymers, ethylene-vinyl 2-ethyl hexanoate copolymers and ethylene-vinyl neodecanoate copolymers, ethylene-vinyl acetate-vinyl 2-ethyl hexanoate terpolymers, ethylene-vinyl acetate-vinyl neo-nonanoate terpolymers, ethylene-vinyl acetate-vinyl neodecanoate terpolymers; comb polymers such as fumarate-vinyl acetate copolymers; hydrocarbon polymers such as hydrogenated polybutadiene copolymers, ethylene/1-alkene copolymers, and similar polymers. Also suitable are additives known in the art as wax anti-settling additives (WASA). Also suitable are condensate species such as alkyl-phenol formaldehyde condensates as described in EP 0 857 776 B1, or hydroxy-benzoate formaldehyde condensates as described in EP-A-1 482 024.

The present invention contemplates the addition of such additional additives; their application in terms of treat rate being known to those skilled in the art. In a preferred embodiment the polymers of the invention are combined with, or used in combination with, one or more of an ethylene-unsaturated ester copolymer, a wax anti-settling additive, an alkyl-phenol formaldehyde condensate or a hydroxy-benzoate formaldehyde condensate. In a more preferred embodiment the polymers of the invention are combined with, or used in combination with, an ethylene-unsaturated ester copolymer, a wax anti-settling additive, and one or both of an alkylphenol formaldehyde condensate or a hydroxy-benzoate formaldehyde condensate. Particularly preferred ethylene-unsaturated ester copolymers are ethylene-vinyl acetate copolymers ethylene-vinyl acetate vinyl 2-ethyl hexanoate terpolymers, ethylene-vinyl acetate vinyl neononanoate terpolymers and ethylene-vinyl acetate vinyl neodecanoate terpolymers. A particularly preferred wax anti-settling additive is the amide-amine salt formed by the reaction of phthalic anhydride with two molar proportions of di-hydrogenated tallow amine. Any additional additives may be introduced separately to the fuel oil composition of the first aspect or combined with the polymers of the invention into the additive concentrates of the fourth aspect.

The invention will now be described by way of example only.

Preparation of the Polymers

The following example illustrates the synthesis of a polymer as used in the present invention. The same method was used to make all other polymers.

Di-dodecyl fumarate (15.40 g, 34.01 mmol), vinyl acetate (1.87 g, 21.72 mmol) and poly(ethyleneglycol methyl ether) acrylate ester having a number average molecular weight of 454 gmol$^{-1}$ (3.27 g, 7.20 mmol) were placed in a Schlenk tube together with cyclohexane (10 ml). The mixture was degassed and then heated with stirring to 80° C. under a nitrogen atmosphere. Tert-butyl perpivalate (0.1 ml, 50:50 wt % in cyclohexane) was added to the mixture to initiate polymerisation. Additional initiator was added to the mixture every hour over the course of the next four hours. Once five hours had elapsed, the mixture was allowed to cool and the product obtained.

Table 1 below details the polymers which were prepared using the following monomers:

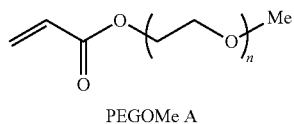

PEGOMe A

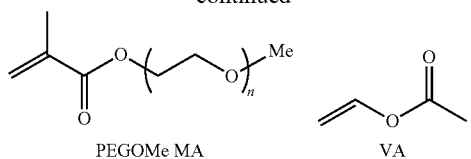

PEGOMe MA

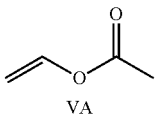

VA

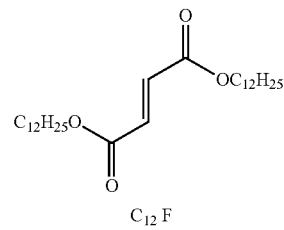

C$_{12}$ F

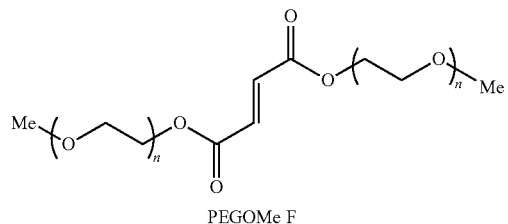

PEGOMe F

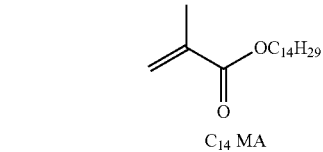

DMAEA     C$_{12}$ A

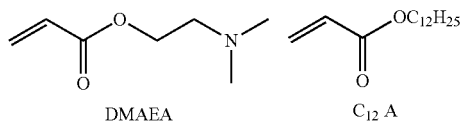

C$_{14}$ MA

TABLE 1

| Polymer | monomer 1 | monomer 2 | monomer 3 | monomer 4 | solvent | Ma |
|---|---|---|---|---|---|---|
| 1 | C$_{12}$ F (34.07) | VA (21.72) | †PEGOMeA (7.20) | — | cyhex | 13,973 |
| 2 | C$_{12}$ F (34.07) | VA (21.72) | †PEGOMeA (7.20) | — | MEK | 14,306 |
| 3 | C$_{12}$ F (34.07) | VA (21.72) | †PEGOMeA (7.20) | — | EtA | 14,775 |
| 4 | C$_{12}$ F (34.07) | VA (21.72) | †PEGOMeA (7.20) | — | tol | 12,575 |
| 5 | C$_{12}$ F (34.07) | VA (14.66) | †PEGOMeA (14.41) | — | MEK | 9,438 |
| 6 | C$_{12}$ F (34.07) | VA (14.66) | †PEGOMeA (14.41) | — | EtA | 8,808 |
| 7 | C$_{12}$ F (34.07) | VA (14.66) | †PEGOMeA (14.41) | — | tol | 8,168 |
| 8 | C$_{12}$ F (34.07) | VA (21.72) | ‡PEGOMeA (7.86) | — | MEK | 13,487 |
| 9 | C$_{12}$ F (34.07) | VA (21.72) | ‡PEGOMeA (7.86) | — | EtA | 6,367 |
| 10 | C$_{12}$ F (34.07) | VA (21.72) | ‡PEGOMeA (7.86) | — | tol | 10,843 |
| 11 | C$_{12}$ F (34.07) | VA (21.72) | †PEGOMeA (7.20) | — | EtA | 5,798 |
| 12 | C$_{12}$ F (34.07) | VA (21.72) | †PEGOMeA (7.20) | — | tol | 6,465 |
| 13 | C$_{12}$ F (34.09) | VA (21.28) | PEGOMeMA (7.09) | — | EtA | 5,640 |
| 14 | C$_{12}$ F (34.09) | VA (14.19) | PEGOMeMA (14.21) | — | EtA | 3,227 |
| 15 | C$_{12}$ F (34.09) | VA (21.28) | PEGOMeMA (7.09) | — | EtA | 1,888 |
| 16 | C$_{12}$ F (34.09) | VA (21.28) | DMAEA (7.13) | — | EtA | 1,360 |
| 17 | C$_{12}$ F (34.09) | VA (14.19) | DMAEA (14.20) | — | EtA | 1,098 |
| 18 | C$_{12}$ F (34.09) | VA (7.09) | DMAEA (21.33) | — | EtA | 904 |
| 19 | C$_{12}$ F (25.60) | VA (28.23) | PEGOMeF (8.52) | — | EtA | 3,284 |
| 20 | C$_{12}$ F (17.12) | VA (28.57) | PEGOMeF (17.08) | — | EtA | 1,960 |
| 21 | C$_{12}$ F (8.61) | VA (28.57) | PEGOMeF (25.60) | — | EtA | 1,393 |
| 22 | C$_{12}$ F (25.69) | VA (14.87) | PEGOMeF (8.57) | C$_{12}$ A (14.04) | EtA | 4,221 |
| 23 | C$_{12}$ F (17.07) | VA (13.82) | PEGOMeF (20.13) | C$_{12}$ A (14.29) | EtA | 1,998 |
| 24 | C$_{12}$ F (8.59) | VA (14.40) | PEGOMeF (25.55) | C$_{12}$ A (14.17) | EtA | 1,723 |
| 25 | C$_{12}$ F (25.53) | VA (14.30) | PEGOMeF (8.53) | C$_{14}$ MA (14.08) | EtA | 6,860 |

TABLE 1-continued

| Polymer | monomer 1 | monomer 2 | monomer 3 | monomer 4 | solvent | Ma |
|---|---|---|---|---|---|---|
| 26 | $C_{12}$ F (17.12) | VA (14.18) | PEGOMeF (17.08) | $C_{14}$ MA (14.26) | EtA | 4,491 |
| 27 | $C_{12}$ F (8.67) | VA (14.41) | PEGOMeF (25.57) | $C_{14}$ MA (14.33) | EtA | 1,545 |

Key:
†PEGOMeA = PEGOMeA monomer of Mn 454;
‡PEGOMeA = PEGOMeA monomer of Mn 804;
(—.—) = amount of each monomer used in mmol;
cyhex = cyclohexane; MEK = methyl ethyl ketone; EtA = ethyl alcohol; tol = toluene The polymers prepared were tested for their CFPP (Cold Filter Plugging Point) performance. CFPP is a standard industry test to evaluate the ability of a fuel oil sample to flow through a filter at reduced temperature. The test which is carried out by the procedure described in detail in Coley, T., et al., entitled: "new laboratory tests for predicting low temperature operability of diesel fuel", *Jn. Of the Institute of Petroleum*, vol. 52, No. 510 (1966), pp 173-193, is designed to correlate with the cold flow of a middle distillate in automotive diesels. In brief, a sample of the oil to be tested (40 cm³) is cooled in a bath which is maintained at about −34° C. to give linear cooling at about 1° C./min. Periodically (at each one degree centigrade starting from above the cloud point), the oil is tested for its ability to flow through a fine screen in a prescribed time period using a test device which is a pipette to whose lower end is attached an inverted funnel which is positioned below the surface of the oil to be tested. Stretched across the mouth of the funnel is a 350 mesh screen having an area defined by a 12 mm diameter. The periodic tests are initiated by applying a vacuum to the upper end of the pipette whereby oil is drawn through the screen up into the pipette to a mark indicating 20 cm³ of oil. After each successful passage, the oil is returned immediately to the CFPP tube. The test is repeated with each one degree drop in temperature until the oil fails to fill the pipette within 60 seconds, the temperature at which failure occurs being reported as the CFPP temperature.

Table 2 below show the CFPP performance of the polymers in a biodiesel fuel oil which was a 75:25 by weight mixture of rape-seed methyl ester (RME) and soya-oil methyl ester (SME). The CFPP of the untreated fuel was −11.0° C. The polymers were tested in an additive formulation which also contained an ethylene-vinyl acetate copolymer, a wax anti-settling additive being the amide-amine salt formed by the reaction of phthalic anhydride with two molar proportions of di-hydrogenated tallow amine and a hydroxy-benzoate formaldehyde condensate. Each column gives the average measured CFPP value for the indicated treat-rate of polymer of the invention which is given in parts per million by weight based on the weight of the fuel oil. Where no value appears this indicates that no measurement was taken.

TABLE 2

| Polymer | 82 wppm | 165 wppm | 247 wppm | 330 wppm | 412 wppm |
|---|---|---|---|---|---|
| 1 | −13.8 | −17.3 | −23.0 | — | −21.0 |
| 2 | −13.0 | −18.0 | −19.5 | −16.3 | — |
| 3 | −12.5 | −17.5 | −19.5 | −19.5 | — |
| 4 | −13.0 | −19.0 | −19.0 | −17.5 | — |
| 5 | −12.3 | −17.8 | −19.8 | −21.3 | −19.0 |
| 6 | −14.5 | −19.0 | −22.5 | −23.5 | — |
| 7 | −13.5 | −18.5 | −22.0 | −21.8 | −17.3 |
| 8 | −12.5 | −18.0 | −20.0 | −20.5 | — |
| 9 | −13.0 | −17.8 | −20.5 | −21.0 | −20.5 |
| 10 | −12.8 | −17.0 | −19.8 | −21.3 | −21.5 |
| 11 | −14.0 | −17.5 | −20.5 | −20.5 | — |
| 12 | −14.5 | −19.0 | −21.5 | −20.0 | — |

| Polymer | 74 wppm | 147 wppm | 221 wppm | 295 wppm |
|---|---|---|---|---|
| 13 | −14.0 | −19.0 | −19.0 | −19.8 |
| 14 | −15.0 | −19.0 | −22.0 | −20.5 |
| 15 | −15.5 | −19.0 | −20.0 | −20.0 |
| 19 | −14.3 | −19.0 | −20.0 | −20.0 |
| 20 | −11.5 | −19.0 | −19.0 | −13.0 |
| 21 | −12.0 | −18.0 | −11.0 | −12.0 |
| 22 | −13.0 | −18.0 | −19.5 | −18.3 |
| 23 | −13.5 | −15.5 | −21.5 | −18.0 |
| 24 | −15.0 | −18.5 | −17.5 | −14.0 |
| 25 | −14.0 | −18.0 | −17.5 | −19.5 |
| 26 | −14.0 | −18.0 | −21.0 | −18.5 |
| 27 | −12.0 | −17.5 | −18.0 | −18.8 |

What is claimed is:

1. A polymer comprising structural units of formula I, structural units of formula II and structural units of formula IIIa:

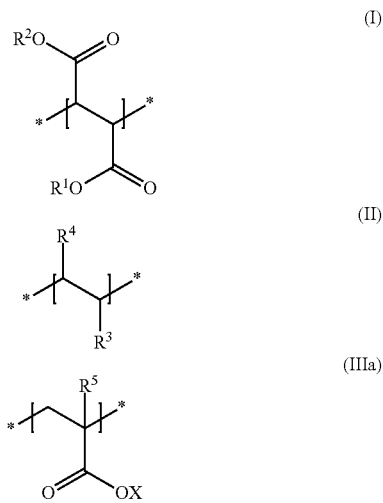

wherein $R^1$ and $R^2$ are the same or different and each represent a $C_8$ to $C_{22}$ alkyl group; wherein $R^3$ represents —$OCOR^6$, —$COOR^{15}$, —COOH, or a $C_1$ to $C_{22}$ alkyl group, and $R^6$ represents a $C_1$ to $C_{22}$ alkyl group; wherein $R^4$ is hydrogen, —COOH or —$CH_2COOR^{16}$; wherein $R^{15}$ and $R^{16}$ are the same or different and each represent a $C_8$ to $C_{22}$ alkyl group; wherein $R^5$ is hydrogen or methyl; wherein X represents a group of formula IV:

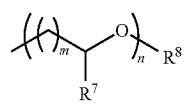 (IV)

wherein $R^7$ represents hydrogen or a $C_1$ to $C_8$ alkyl group, $R^8$ represents a $C_1$ to $C_8$ alkyl group, m is an integer from 1 to 10, and n is an integer from 1 to 30.

2. A polymer according to claim 1 wherein $R^1$ and $R^2$ are the same and each represent a linear $C_{12}$ to $C_{14}$ alkyl group.

3. A polymer according to claim 1 wherein $R^3$ represents —$OCOR^6$.

4. A polymer according to claim 3 wherein $R^6$ is methyl or 2-ethylhexyl and $R^4$ is hydrogen.

5. A polymer according to claim 1 wherein $R^7$ is hydrogen, $R^8$ is methyl, m is an integer from 1 to 6 and n is an integer from 6 to 18.

6. A polymer according to claim 1 further comprising structural units of formula VII,

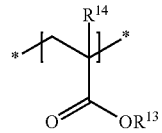 (VII)

wherein $R^{13}$ represents a $C_8$ to $C_{22}$ alkyl group; and
wherein $R^{14}$ is hydrogen or methyl.

7. A polymer according to claim 6 wherein $R^{13}$ represents a linear $C_{12}$ to $C_{16}$ alkyl group.

\* \* \* \* \*